(12) United States Patent
Sawada et al.

(10) Patent No.: US 10,969,259 B2
(45) Date of Patent: Apr. 6, 2021

(54) FLOW RATE CONTROL DEVICE, METHOD OF CALIBRATING FLOW RATE OF FLOW RATE CONTROL DEVICE, FLOW RATE MEASURING DEVICE, AND METHOD OF MEASURING FLOW RATE USING FLOW RATE MEASURING DEVICE

(71) Applicant: FUJIKIN INCORPORATED, Osaka (JP)

(72) Inventors: Yohei Sawada, Osaka (JP); Masaaki Nagase, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 204 days.

(21) Appl. No.: 16/309,697

(22) PCT Filed: Jun. 22, 2017

(86) PCT No.: PCT/JP2017/023013
§ 371 (c)(1),
(2) Date: Dec. 13, 2018

(87) PCT Pub. No.: WO2018/008420
PCT Pub. Date: Jan. 11, 2018

(65) Prior Publication Data
US 2019/0137309 A1    May 9, 2019

(30) Foreign Application Priority Data
Jul. 5, 2016  (JP) .............................. JP2016-132948

(51) Int. Cl.
*G01F 1/42* (2006.01)
*G05D 7/00* (2006.01)
(Continued)

(52) U.S. Cl.
CPC .............. *G01F 1/42* (2013.01); *G01F 15/005* (2013.01); *G01F 25/003* (2013.01);
(Continued)

(58) Field of Classification Search
None
See application file for complete search history.

(56) References Cited

U.S. PATENT DOCUMENTS

| | | | | |
|---|---|---|---|---|
| 6,360,579 B1* | 3/2002 | De Boom | ............. | G01F 25/003 |
| | | | | 73/1.35 |
| 2009/0019943 A1* | 1/2009 | Ozawa | ...................... | G01F 1/50 |
| | | | | 73/861 |

(Continued)

FOREIGN PATENT DOCUMENTS

| | | |
|---|---|---|
| JP | 2002-540415 A | 11/2002 |
| JP | 2011-064707 A | 3/2011 |

(Continued)

OTHER PUBLICATIONS

International Search Report issued in PCT/JP2017/023013; dated Sep. 5, 2017.

*Primary Examiner* — Paul M. West
*Assistant Examiner* — Mark A Shabman
(74) *Attorney, Agent, or Firm* — Studebaker & Brackett PC (57) ABSTRACT

In a method of calibrating a flow rate control device in which a flow rate is calibrated based on comparison with a flow rate measured by a flow rate reference gauge, a predetermined permissible error range is set for a plurality of flow rate settings, and the permissible error range of at least one specific flow rate setting among the plurality of flow rate settings is set to be smaller than the predetermined permissible error range.

8 Claims, 3 Drawing Sheets

(51) Int. Cl.
 *G01F 15/00* (2006.01)
 *G01F 25/00* (2006.01)
 *G01F 1/36* (2006.01)

(52) U.S. Cl.
 CPC ...... *G01F 25/0007* (2013.01); *G01F 25/0053* (2013.01); *G01F 25/0084* (2013.01); *G05D 7/00* (2013.01); *G01F 1/363* (2013.01)

(56) References Cited

U.S. PATENT DOCUMENTS

2014/0083159 A1* 3/2014 Nagai .................. G05D 7/0635
 73/1.34
2015/0241264 A1 8/2015 Nagai

FOREIGN PATENT DOCUMENTS

| JP | 4648098 B2 | 3/2011 |
| JP | 2014-063348 A | 4/2014 |
| JP | 2015-058059 A | 3/2015 |

\* cited by examiner

Fig. 4

FLOW RATE CONTROL DEVICE, METHOD OF CALIBRATING FLOW RATE OF FLOW RATE CONTROL DEVICE, FLOW RATE MEASURING DEVICE, AND METHOD OF MEASURING FLOW RATE USING FLOW RATE MEASURING DEVICE

TECHNICAL FIELD

The present invention relates to a flow rate control device, a method of calibrating a flow rate of a flow rate control device, a flow rate measuring device, and a method of measuring a flow rate using a flow rate measuring device.

BACKGROUND ART

Gas supply systems provided in semiconductor manufacturing equipment or other such equipment are generally configured such that many types of gas are supplied by a flow rate control device provided for each type of supply gas while switching the gas depending on the target that uses the gas such as a process chamber.

Pressure-type pressure flow rate control devices and thermal mass flow rate control devices (MFC) that are calibrated to a predetermined accuracy are used as flow rate control devices, and control the flow rate of gas.

Here, the accuracy of the flow rate control devices is determined to be, for example, a certain percent of setpoint (% SP) (flow rate is controllable with error within plus/minus of that certain percent relative to a flow rate setting) or a certain percent of full scale (% FS) (flow rate is controllable with error within plus/minus of that certain percent of the maximum flow rate relative to a flow rate setting) with respect to a reference flow rate prescribed for each manufacturer.

In the case of applying the above-described flow rate control devices, it is desirable to check the accuracy of flow rates and calibrate the flow rates whenever necessary, and as the method of measuring flow rates, the Rate of Rise (ROR) method may be used to check the accuracy of flow rates and calibrate the flow rates.

In the ROR method, a flow rate Q is computed from, for example, $Q=(\Delta P/\Delta t)\times V/RT$, where R is the gas constant, by passing gas to a predetermined reference volume (V) that is provided downstream of a flow rate control device and measuring the rate of pressure rise ($\Delta P/\Delta t$) and the temperature (T) at that time.

Patent Literature (PTL) 1 discloses one example of a flow rate measuring method using the ROR method. In the gas supply device disclosed in PTL 1, a flow passage from an on-off valve on the downstream side of a flow rate control device connected to each gas supply line to an on-off valve provided in a common gas supply line is used as a reference volume, and flow rates are measured on the basis of the rate of pressure rise in this flow passage.

CITATION LIST

Patent Literature

PTL 1: Japanese Patent Application Laid-Open No. 2006-337346 (Japanese Patent No. 4648098)

SUMMARY OF INVENTION

Technical Problem

The volume of the reference volume used in the ROR method varies according to piping design, manufacturing tolerance, and other such factors and is thus calculated for each gas supply system by using flow rate settings set in flow rate control devices whose flow rates have been calibrated. However, even the calibrated flow rate control devices have error within a predetermined permissible range in the flow rate settings set in the flow rate control devices and controlled flow rates that are controlled in accordance with the flow rate settings, and thus the volume of the reference volume will undesirably contain the predetermined permissible error of the flow rate control devices. That is, a problem remains in that since the volume of the reference volume used in the arithmetic expression of the flow rate Q contains the aforementioned error, flow rate cannot be accurately measured as a result.

Although the predetermined permissible error in the flow rate settings and the controlled flow rates can be reduced by repeatedly performing calibration, a realistic line between advantages and disadvantages is drawn in consideration of the time and cost required for calibration.

The present invention has been achieved in light of the above-described problems, and it is a primary object of the present invention to provide a method of calibrating the flow rate of a flow rate control device in order to implement a method of measuring a flow rate in a relatively short time with high accuracy using a flow rate measuring device while keeping costs down.

Solution to Problem

A method of calibrating a flow rate control device according to an embodiment of the present invention is a method of calibrating a flow rate control device, in which the flow rate is calibrated based on comparison with a flow rate measured by a flow rate reference gauge. A predetermined permissible error range is set for a plurality of flow rate settings, and a permissible error range of at least one specific flow rate setting among the plurality of flow rate settings is set to be smaller than the predetermined permissible error range.

The flow rate control device according to an embodiment of the present invention is a flow rate control device calibrated by the above-described flow rate calibration method.

In one embodiment, the flow rate control device includes a storage device. The storage device stores information for identifying the at least one specific flow rate setting.

In one embodiment, the flow rate control device is used to measure a volume of a reference volume connected on a downstream side of the flow rate control device.

A flow rate measuring device according to an embodiment of the present invention is a flow rate measuring device that is connected on the downstream side of the above-described flow rate control device and for measuring a flow rate of gas flowing into the reference volume. The flow rate measuring device includes a pressure sensor that measures a pressure of the reference volume, and a temperature sensor that measures a temperature of the reference volume. The flow rate measuring device is configured to measure the flow rate on the basis of the volume of the reference volume, a rate of pressure change in the reference volume, and the temperature of the reference volume that are measured by passing gas from the flow rate control device to the reference volume at the at least one specific flow rate setting.

A flow rate measuring method according to an embodiment of the present invention is a flow rate measuring method for use in a gas supply system that includes a flow rate control device, a reference volume provided downstream of the flow rate control device, and a flow rate measuring device that measures a flow rate of gas flowing into the reference volume. The flow rate measuring method includes the steps of calibrating a flow rate of the flow rate control device on the basis of comparison with a flow rate measured by a flow rate reference gauge, in which a predetermined permissible error range is set for a plurality of flow rate settings, and a permissible error range of at least one specific flow rate setting among the plurality of flow rate settings is set to be smaller than the predetermined permissible error range, measuring a volume of the reference volume by passing gas from the flow rate control device to the reference volume at the at least one specific flow rate setting, and measuring the flow rate with the flow rate measuring device on the basis of a rate of pressure change in the reference volume, a temperature of the reference volume, and the measured volume of the reference volume that are obtained when gas flows into the reference volume.

A flow rate measuring method according to an embodiment of the present invention is a flow rate measuring method for use in a gas supply system that includes a plurality of gas supply lines connected respectively to a plurality of gas supply sources, a plurality of flow rate control devices provided respectively in the plurality of gas supply lines, a plurality of first valves provided respectively in the plurality of gas supply lines, a common gas supply line connected in common to the plurality of gas supply lines on a downstream side of the plurality of first valves, a second valve provided in the common gas supply line, a pressure sensor that measures a pressure of a flow passage between the plurality of first valves and the second valve, and a temperature sensor that measures a temperature of the flow passage between the plurality of first valves and the second valve. The flow rate measuring method is a method of using the flow passage between the plurality of first valves and the second valve as a reference volume, and measuring a flow rate of gas on the basis of a pressure change indicated by the pressure sensor and the temperature indicated by the temperature sensor when gas flows into the reference volume via any one of the plurality of flow rate control devices while the second valve is closed. For at least one flow rate control device among the plurality of flow rate control devices, a flow rate is calibrated based on comparison with a flow rate measured by a flow rate reference gauge, before the flow rate control device is incorporated into the flow rate control system, a predetermined permissible error range is set for a plurality of flow rate settings, and a permissible error range of at least one specific flow rate setting among the plurality of flow rate settings is set to be smaller than the predetermined permissible error range. After the at least one flow rate control device is incorporated into the flow rate control system, a volume of the reference volume is measured by passing gas to the reference volume at the at least one specific flow rate setting, and the measured volume is used to measure the flow rate.

A method of measuring a flow rate according to an embodiment of the present invention is a flow rate measuring method for use in a gas supply system that includes a plurality of gas supply lines connected respectively to a plurality of gas supply sources, a plurality of flow rate control devices provided respectively in the plurality of gas supply lines, a plurality of first valves provided respectively in the plurality of gas supply lines, a common gas supply line connected in common to the plurality of gas supply lines on a downstream side of the plurality of first valves, a second valve provided in the common gas supply line, a pressure sensor that measures a pressure of a flow passage between the plurality of first valves and the second valve, and a temperature sensor that measures a temperature of the flow passage between the plurality of first valves and the second valve. The flow rate measuring method is a method of using the flow passage between the plurality of first valves and the second valve as a reference volume, and measuring a flow rate of gas on the basis of a pressure change indicated by the pressure sensor and the temperature indicated by the temperature sensor when gas flows into the reference volume via any one of the plurality of flow rate control devices while the second valve is closed. For at least one flow rate control device among the plurality of flow rate control devices, a flow rate is calibrated based on comparison with a flow rate measured by a flow rate reference gauge, before the flow rate control device is incorporated into the flow rate control system, a predetermined permissible error range is set for a plurality of flow rate settings, and the flow rate measured by the flow rate reference gauge at least one specific flow rate setting among the plurality of flow rate settings is stored in a storage device of the flow rate control device in association with the at least one specific flow rate setting. After the at least one flow rate control device is incorporated into the flow rate control system, a volume of the reference volume is measured by passing gas to the reference volume at the at least one specific flow rate setting and by using the flow rate measured by the flow rate reference gauge and stored in the storage device of the flow rate control device, and the measured volume is used to measure the flow rate.

Advantageous Effects of Invention

According to embodiments of the present invention, accurate flow rate measurements and other such operations are achieved with a relatively simple structure.

DESCRIPTION OF EMBODIMENTS

An embodiment of the present invention will be described hereinafter with reference to the drawings, but the present invention is not limited to the embodiment described below.

Figure 1:
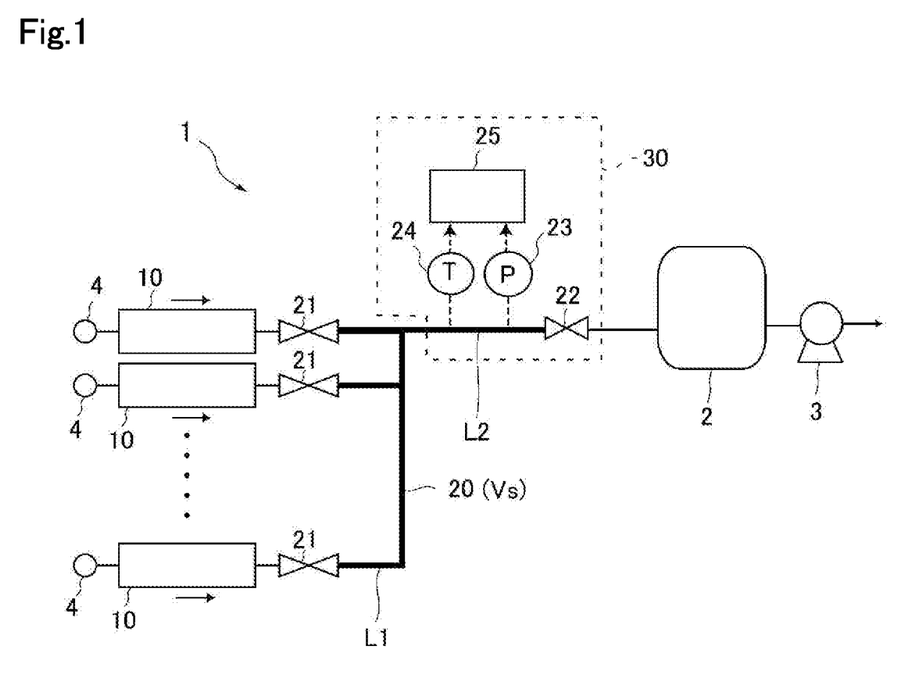
FIG. 1 illustrates a mode in which a gas supply system that incorporates a plurality of flow rate control devices according to an embodiment of the present invention is connected to semiconductor manufacturing equipment (process chamber).

FIG. 1 illustrates a gas supply system 1 according to an embodiment of the present invention, the gas supply system being configured to supply gas from a plurality of gas supply sources 4 via flow rate control devices 10 to a process chamber 2 in semiconductor manufacturing equipment.

The gas supply system 1 includes a plurality of gas supply lines L1 connectable to the plurality of gas supply sources 4, the plurality of flow rate control devices 10 interposed respectively in the plurality of gas supply lines L1, first valves 21 provided on the downstream sides of the plurality of flow rate control devices 10, a common gas supply line L2 that joins the gas supply lines L1, a second valve 22 provided in the common gas supply line L2, a pressure sensor 23 and a temperature sensor 24 that respectively measure pressure and temperature in flow passages between the first valves 21 and the second valve 22, and an arithmetic and control unit 25 that receives outputs from the pressure sensor 23 and the temperature sensor 24.

The downstream side of the gas supply system 1 is connected via the valve 22 to the process chamber 2 that consumes gas, allowing the supply of gas. The process chamber 2 is also connected to a vacuum pump 3, allowing, for example, the process chamber 2 and the gas supply lines L1 and L2 to be evacuated as necessary.

In the present embodiment, the gas supply lines L1 and the common gas supply line may branch off into other gas lines, and may be provided with other valves for implementing the functions of such other gas lines. Preferable examples of the first valves 21, the second valve 22, and the aforementioned valves for implementing the functions of the other gas lines include fluid-operated valves such as AOVs, and electrically operated valves such as solenoid valves and motor-operated valves. In another embodiment, the first valves 21 may be on-off valves built into the flow rate control devices 10.

The arithmetic and control unit 25 may be an external processing unit such as a computer, or may be a processing unit (a control circuit including a processor and a memory) provided in a flow rate measuring device 30 that integrally includes the pressure sensor 23 and the temperature sensor 24 (and the second valve 22) as shown.

Figure 2:
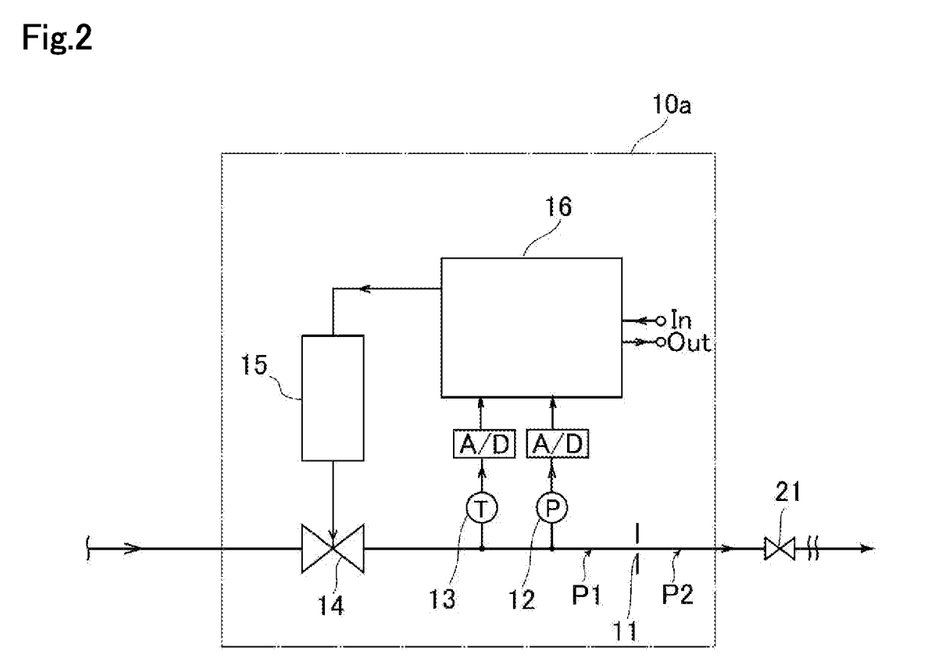
FIG. 2 illustrates an exemplary configuration of a pressure-type flow rate control device as one example of the flow rate control devices according to the embodiment of the present invention.

FIG. 2 illustrates an exemplary configuration of a pressure-type flow rate control device 10a used as one example of the flow rate control devices 10 according to the present embodiment. The pressure-type flow rate control device 10a includes a restriction part (e.g., orifice plate) 11 having a minute opening (orifice), a control valve 14 provided on the upstream side of the restriction part 11, an actuator 15 of the control valve 14, and a pressure sensor 12 and a temperature sensor 13 that are provided between the restriction part 11 and the control valve 14.

The pressure-type flow rate control device 10a described above is configured to control the flow rate by measuring and controlling an upstream pressure P1, but the pressure-type flow rate control device used as the flow rate control devices 10 is not limited to this type of pressure-type flow rate control device and may, for example, be a thermal flow rate control device (MFC) or other types of flow rate control devices.

Referring again to FIG. 1, in the gas supply system 1 configured as described above, the flow rate can be measured by the ROR method using the flow passages (portions indicated by bold lines in FIG. 1) between the first valves 21 and the second valve 22 as a reference volume 20 (volume Vs). Specifically, after the flow passages are evacuated, a first valve 21 that corresponds to one of the plurality of flow rate control devices 10 is opened to pass gas to the reference volume 20, and the second valve 22 is closed. Then, on the basis of the rate of pressure change ($\Delta P/\Delta t$) indicated at that time by the pressure sensor 23 and the temperature T measured at that time by the temperature sensor 24, the flow rate Q of the gas actually controlled by the flow rate control device 10 can be obtained from $Q=(\Delta P/\Delta t) \times Vs/RT$, where R is the gas constant.

In the case of using the flow passages on the downstream side of the flow rate control devices 10 as the reference volume 20 in the gas supply system 1 illustrated in FIG. 1, since the volume Vs of the reference volume 20 varies according to piping design, manufacturing tolerance, or other such factors, it is desirable to obtain the volume Vs of the reference volume 20 by an appropriate method after connecting the plurality of flow rate control devices 10 through piping or other components to construct the gas supply system 1.

The volume Vs of the reference volume 20 can be calculated based on $Qs=(\Delta P/\Delta t) \times (Vs/RT)$ by, for example, passing gas to the reference volume 20 at a flow rate setting Qs set in the flow rate control device 10 and measuring the rate of pressure change at that time. Here, $\Delta P/\Delta t$ is a pressure change ($\Delta P=P_{t2}-P_{t1}$) over a predetermined period ($\Delta t=t2-t1$), R is the gas constant, and T is the gas temperature. In this way, the volume Vs of the reference volume 20 is obtained based on $\Delta P/\Delta t$ caused by the flow rate settings Qs set in the flow rate control device 10 and the controlled flow rates obtained by controlling the flow rate control device in accordance with the flow rate settings Qs. Thus, if the flow rate settings Qs contain error relative to actual flow rates, the obtained volume Vs of the reference volume also contains error.

Incidentally, before the flow rate control devices 10 are incorporated into the gas supply system 1, controlled flow rates controlled in accordance with the flow rate settings Qs are measured with a flow rate reference gauge and the flow rate control devices 10 are calibrated such that the differences between the flow rates indicated by the flow rate reference gauge and the flow rate settings Qs fall within a permissible error range.

The flow rate reference gauge used in calibration is prepared in advance so as to be capable of indicating accurate flow rates with extremely high precision. Examples of the flow rate reference gauge include Molblocs (manufactured by DH instruments, Inc.) and suitable flow rate sensors such as mass flowmeters whose flow rates are strictly calibrated based on actual flow rates.

In this way, the flow rate control devices 10 are calibrated for a plurality of flow rate settings through comparison between the flow rate settings Qs and the controlled flow rates controlled in accordance with the flow rate settings Qs and measured by the flow rate reference gauge. Here, the plurality of flow rate settings correspond to, for example, 0 to 100% flow rates when the maximum flow rate setting is assumed to be a 100% flow rate. The flow rate settings for calibration may, for example, be discrete flow rate settings every 10%, such as a 10% flow rate, a 20% flow rate, . . . , a 90% flow rate, and a 100% flow rate, or may be continuous flow rate settings.

Figure 3:
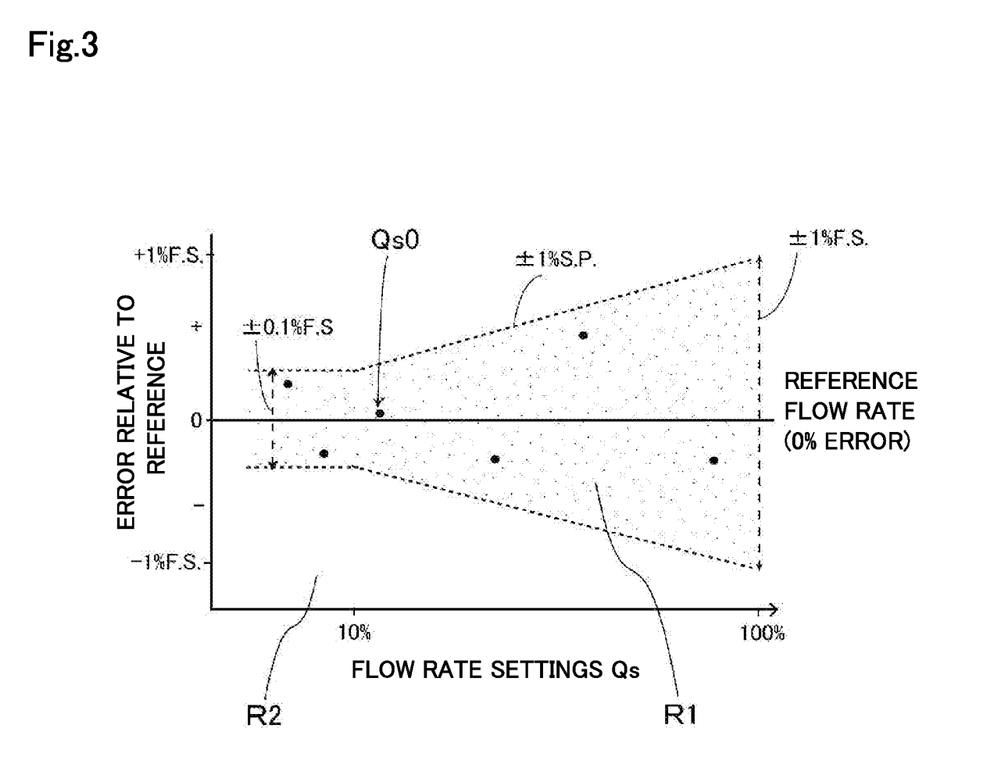
FIG. 3 is a diagram for describing error in flow rate settings relative to a reference flow rate indicated by a flow rate reference gauge and a permissible error range in the operation of calibrating a flow rate control device using the flow rate reference gauge.

FIG. 3 illustrates a predetermined permissible error range R1 (specification range) provided over the full range of flow rate settings Qs. The calibration of flow rates is performed such that the differences between the flow rate settings Qs to be input to the flow rate control devices 10 and the measured flow rates received from the flow rate reference gauge that measures flow rates controlled by the flow rate control devices fall within a predetermined permissible error range.

In the present embodiment, the aforementioned calibration operation is performed for at least one flow rate control device 10 to be incorporated into the gas supply system 1 until the difference between a specific one or number of flow rate settings Qs0 (e.g., 50 sccm) from among the above-described plurality of flow rate settings and the reference flow rate indicated by the flow rate reference gauge satisfies a reference value that is smaller than the predetermined permissible error range R1 (specification range). As a result, at the specific flow rate setting(s) Qs0, error relative to actual flow rates (or reference flow rate) is further reduced, and more accurate flow rate control is possible than at other flow rate settings.

The specific flow rate settings Qs0 may be arbitrary flow rate settings and may be selected appropriately by the user. Also, the specific flow rate settings Qs0 may be stored in a storage device (memory) of the flow rate control device 10 as flow rate settings with smaller error relative to the reference flow rate.

In this way, at a single or plurality of specific flow rate settings Qs0 of a predetermined flow rate control device 10, the permissible error range with respect to the reference flow rate is set to be smaller than the permissible error range at other flow rate settings. In the mode illustrated in FIG. 3, when the flow rate setting Qs exceeds 10% of the maximum flow rate, the predetermined permissible error range R1 is defined to be less than or equal to +/−1% of setpoint, and when the specific flow rate setting Qs is less than or equal to 10% of the maximum flow rate, the predetermined permissible error range R1 is defined to be less than or equal to +/−0.1% of full scale. For example when the specific set flow rate setting Qs is less than or equal to 10% of the maximum flow rate, the permissible error range is set to fall within an error range of less than +/−0.1% of full scale (e.g., less than or equal to +/−0.05% of full scale).

The volume Vs of the reference volume can be measured by, for example, the flow rate measuring device 30 that includes the arithmetic and control unit 25 illustrated in FIG. 1. The flow rate measuring device 30 receives input of information for identifying a flow rate control device 10 that has undergone the above-described calibration operation and information for identifying the specific flow rate setting(s) Qs0 of that flow rate control device 10. The information for identifying the specific flow rate setting(s) Qs0 may be input in advance in the flow rate measuring device 30 and stored in the memory of the arithmetic and control unit 25, or may be read out from the memory of the flow rate control device 10 at the time of measuring the volume Vs.

Figure 4:
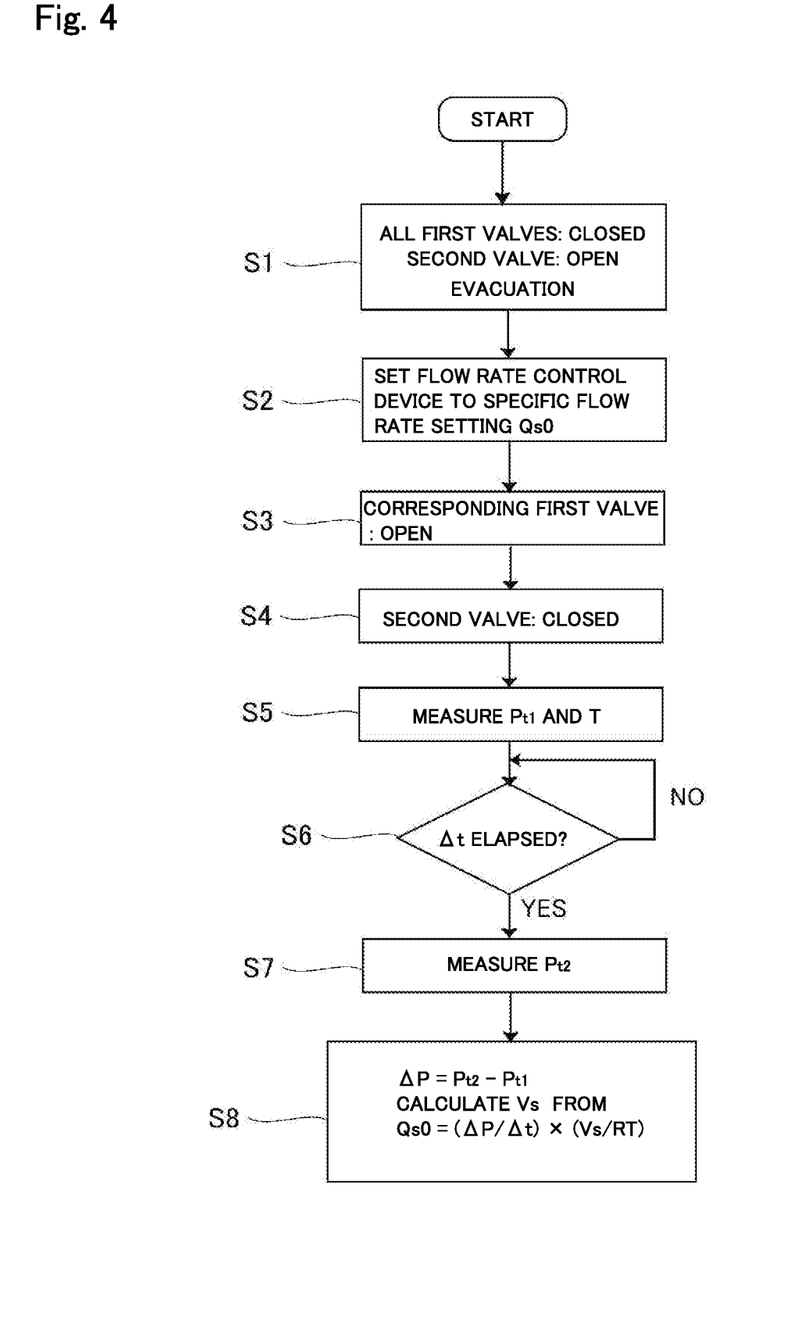
FIG. 4 is a flowchart showing the procedure for measuring a volume Vs of a reference volume.

One example of the method of measuring the volume Vs of the reference volume 20 will be described hereinafter with reference to FIGS. 1 and 4.

First, as indicated in step S1, with all the first valves 21 closed and the second valve 22 open, the gas supply system 1 is evacuated by the vacuum pump 3 and fluid is exhausted from the reference volume 20. Then, as indicated in step S2, the flow rate of a flow rate control device 10 that has undergone the aforementioned flow rate calibration is set to a specific flow rate setting Qs0.

Next, as indicated in step S3, the first valve 21 on the downstream side of the above flow rate control device 10 is opened to pass gas to the reference volume 20 at the specific flow rate setting Qs0. Then, after the elapse of a predetermined of time during which the flow of the gas stabilizes, the second valve 22 is closed as indicated in step S4. The pressure in the reference volume 20 thereby starts to rise.

At this time, as indicated in step S5, the pressure $P_{t1}$ of the reference volume 20 is measured with the pressure sensor 23, and the temperature T is measured with the temperature sensor 24 at time t1. Thereafter, at time t2 (t2−t1=Δt) after a predetermined time Δt has elapsed, the increased pressure $P_{t2}$ of the reference volume 20 is measured with the pressure sensor 23 as indicated in steps S6 and S7. The time Δt can be counted from, for example, the sampling cycle of the pressure sensor 23.

Next, as indicated in step S8, the arithmetic and control unit 25 obtains ΔP=$P_{t2}$−$P_{t1}$ and can calculate the volume Vs from, for example, Qs0=(ΔP/Δt)×(Vs/RT), where R is the gas constant. The volume Vs of the reference volume 20 obtained in this way has high accuracy because it is obtained using the flow rate setting Qs0 with little error obtained by highly accurate calibration.

The volume Vs of the reference volume obtained as described above can be used in the ROR method to measure a flow rate through steps similar to those described above.

To give a specific example, first, with all the first valves 21 closed and the second valve 22 open, the reference volume 20 is evacuated by the vacuum pump 3. Then, a first valve 21 provided on the downstream side of any one of the flow rate control devices 10 is opened to pass gas at an arbitrary flow rate setting Qs via the flow rate control device 10. Then, after the elapse of a predetermined period of time during which the flow of the gas stabilizes, the second valve 22 is closed.

Thereafter, the pressure $P_{t1}$ of the reference volume 20 is measured with the pressure sensor 23 and the temperature T is measured with the temperature sensor 24. Also, the pressure $P_{t2}$ of the reference volume is measured after a predetermined time Δt has elapsed. Thereafter, ΔP=$P_{t2}$−$P_{t1}$ is obtained, and the actual flow rate Q can be measured from Q=(ΔP/Δt)×Vs/RT by using the known volume Vs of the reference volume stored in, for example, a memory.

The flow rate Q measured as described above may be used in comparative verification using the flow rate settings Qs of the flow rate control device 10, and it is also possible to calibrate the flow rate settings Qs of an arbitrary flow rate control device 10 on the basis of the flow rate Q obtained by the above-described ROR method.

While one embodiment of the present invention has been described above, the present invention may be modified in various ways. In the above-described embodiment, gas is passed at a specific flow rate setting Qs0 for which a particularly strict calibration operation has been performed in advance, and the specific flow rate setting Qs0 at that time is used to measure the volume Vs of the reference volume 20. However, instead of performing a strict calibration operation for the specific flow rate settings Qs0, flow rates Qs0' that are indicated by the flow rate reference gauge at the specific flow rate settings Qs0 may be stored in, for example, a memory in association with the specific flow rate settings Qs0, and these flow rates Qs0' may be used to obtain the volume Vs of the reference volume 20.

In this mode, for example, when the flow rate setting Qs0 of a flow rate control device is 50 sccm, the flow rate indicated by the flow rate reference gauge in the calibration operation may be 49.9 sccm. In this case, in the process of obtaining the volume Vs of the reference volume 20 (e.g., step S8 in the flowchart illustrated in FIG. 4), the volume Vs is obtained from Qs0'=(ΔP/Δ×Vs/RT) using Qs0' of 49.9 sccm, instead of using Qs0 of 50 sccm. Accordingly, a more accurate volume Vs can be obtained. After the more accurate volume Vs has been obtained in this way, the flow rate can be measured by the ROR method in the same manner as described above.

INDUSTRIAL APPLICABILITY

The flow rate control devices that adopt the flow rate calibration method according to the embodiment of the present invention allows accurate flow rate measurements even after the flow rate control devices are incorporated into a gas supply system.

REFERENCE SIGNS LIST

1 Gas supply system
2 Process chamber

3 Vacuum pump
4 Gas supply source
10 Flow rate control device
11 Restriction part
12 Pressure sensor
13 Temperature sensor
14 Control valve
15 Actuator
16 Control circuit
20 Reference volume
21 First valve
22 Second valve
23 Pressure sensor
24 Temperature sensor
25 Arithmetic and control unit
30 Flow rate measuring device

The invention claimed is:

1. A method of calibrating a flow rate of a flow rate control device, in which the flow rate is calibrated based on comparison with a flow rate measured by a flow rate reference gauge, wherein
a predetermined permissible error range is set for a plurality of flow rate settings, and
a permissible error range of at least one specific flow rate setting among the plurality of flow rate settings is set to be smaller than the predetermined permissible error range,
wherein a calibration of the flow rate control device is performed before the flow rate control device is incorporated into a gas supply system,
the predetermined permissible error range for the plurality of the flow rate settings except for the at least one specific flow rate setting is defined as a continuous target range having a border line extending at constant or linearly expanding with respect to the flow rate, while the permissible error range of the at least one specific flow rate setting is set to have a discrete small target value against the predetermined permissible error range for the plurality of the flow rate settings, and
a calibration for the at least one specific flow rate setting is continued until an error is further reduced than errors in flow rate settings in the vicinity of the at least one specific flow rate setting.

2. A flow rate control device calibrated by the method of calibrating the flow rate according to claim 1.

3. The flow rate control device according to claim 2, comprising:
a storage device,
the storage device storing information for identifying the at least one specific flow rate setting.

4. The flow rate control device according to claim 2, wherein
the flow rate control device is used to measure a volume of a reference volume connected on a downstream side of the flow rate control device.

5. A flow rate measuring device that is connected on the downstream side of the flow rate control device according to claim 4 and for measuring a flow rate of gas flowing into the reference volume, the flow rate measuring device comprising:
a pressure sensor that measures a pressure of the reference volume; and
a temperature sensor that measures a temperature of the reference volume,
wherein the flow rate measuring device is configured to measure the flow rate on the basis of the volume of the reference volume, a rate of pressure change in the reference volume, and the temperature of the reference volume that are measured by passing gas from the flow rate control device to the reference volume at the at least one specific flow rate setting.

6. A flow rate measuring method for use in a gas supply system that includes a flow rate control device, a reference volume provided downstream of the flow rate control device, and a flow rate measuring device that measures a flow rate of gas flowing into the reference volume, the flow rate measuring method comprising the steps of:
calibrating a flow rate of the flow rate control device on the basis of comparison with a flow rate measured by a flow rate reference gauge, in which a predetermined permissible error range is set for a plurality of flow rate settings, and a permissible error range of at least one specific flow rate setting among the plurality of flow rate settings is set to be smaller than the predetermined permissible error range,
wherein a calibration of the flow rate control device is performed before the flow rate control device is incorporated into a gas supply system,
the predetermined permissible error range for the plurality of the flow rate settings except for the at least one specific flow rate setting is defined as a continuous target range having a border line extending at constant or linearly expanding with respect to the flow rate, while the permissible error range of the at least one specific flow rate setting is set to have a discrete small target value against the predetermined permissible error range for the plurality of the flow rate settings, and
a calibration for the at least one specific flow rate setting is continued until an error is further reduced than errors in flow rate settings in the vicinity of the at least one specific flow rate setting;
measuring a volume of the reference volume by passing gas from the flow rate control device to the reference volume at the at least one specific flow rate setting; and
measuring the flow rate with the flow rate measuring device on the basis of a rate of pressure change in the reference volume, a temperature of the reference volume, and the measured volume of the reference volume that are obtained when gas flows into the reference volume.

7. A flow rate measuring method for use in a gas supply system that includes:
a plurality of gas supply lines connected respectively to a plurality of gas supply sources;
a plurality of flow rate control devices provided respectively in the plurality of gas supply lines;
a plurality of first valves provided respectively in the plurality of gas supply lines;
a common gas supply line connected in common to the plurality of gas supply lines on a downstream side of the plurality of first valves;
a second valve provided in the common gas supply line;
a pressure sensor that measures a pressure of a flow passage between the plurality of first valves and the second valve; and
a temperature sensor that measures a temperature of the flow passage between the plurality of first valves and the second valve,
the flow rate measuring method being a method of using the flow passage between the plurality of first valves and the second valve as a reference volume, and measuring a flow rate of gas on the basis of a pressure change indicated by the pressure sensor and the temperature indicated by the temperature sensor when gas flows into the reference volume via any one of the plurality of flow rate control devices while the second valve is closed, wherein, for at least one flow rate control device among the plurality of flow rate control devices, a flow rate is calibrated based on comparison with a flow rate measured by a flow rate reference gauge, before the flow rate control device is incorporated into the gas supply system, a predetermined permissible error range is set for a plurality of flow rate settings, and a permissible error range of at least one specific flow rate setting among the plurality of flow rate settings is set to be smaller than the predetermined permissible error range, and after the at least one flow rate control device is incorporated into the gas supply system, a volume of the reference volume is measured by passing gas to the reference volume at the at least one specific flow rate setting, and the measured volume is used to measure the flow rate.

8. A flow rate measuring method for use in a gas supply system that includes:
- a plurality of gas supply lines connected respectively to a plurality of gas supply sources;
- a plurality of flow rate control devices provided respectively in the plurality of gas supply lines;
- a plurality of first valves provided respectively in the plurality of gas supply lines;
- a common gas supply line connected in common to the plurality of gas supply lines on a downstream side of the plurality of first valves;
- a second valve provided in the common gas supply line;
- a pressure sensor that measures a pressure of a flow passage between the plurality of first valves and the second valve; and
- a temperature sensor that measures a temperature of the flow passage between the plurality of first valves and the second valve, the flow rate measuring method being a method of using the flow passage between the plurality of first valves and the second valve as a reference volume, and measuring a flow rate of gas on the basis of a pressure change indicated by the pressure sensor and the temperature indicated by the temperature sensor when gas flows into the reference volume via any one of the plurality of flow rate control devices while the second valve is closed, wherein, for at least one flow rate control device among the plurality of flow rate control devices, a flow rate is calibrated based on comparison with a flow rate measured by a flow rate reference gauge, before the flow rate control device is incorporated into the gas supply system, a predetermined permissible error range is set for a plurality of flow rate settings, and the flow rate measured by the flow rate reference gauge for at least one specific flow rate setting among the plurality of flow rate settings is stored in a storage device of the flow rate control device in association with the at least one specific flow rate setting, and after the at least one flow rate control device is incorporated into the gas supply system, a volume of the reference volume is measured by passing gas to the reference volume at the at least one specific flow rate setting and by using the flow rate measured by the flow rate reference gauge and stored in the storage device of the flow rate control device, and the measured volume is used to measure the flow rate.

* * * * *